United States Patent
Polak

(10) Patent No.: US 11,336,013 B2
(45) Date of Patent: May 17, 2022

(54) ANTENNA FOR UNDERGROUND LINE LOCATION

(71) Applicant: METROTECH CORPORATION, Santa Clara, CA (US)

(72) Inventor: Stevan Polak, Los Gatos, CA (US)

(73) Assignee: Metrotech Corporation, Santa Clara, CA (US)

( * ) Notice: Subject to any disclaimer, the term of this patent is extended or adjusted under 35 U.S.C. 154(b) by 0 days.

(21) Appl. No.: 15/011,205

(22) Filed: Jan. 29, 2016

(65) Prior Publication Data

US 2016/0223701 A1 Aug. 4, 2016

Related U.S. Application Data

(60) Provisional application No. 62/110,384, filed on Jan. 30, 2015.

(51) Int. Cl.
*H01Q 7/08* (2006.01)
*H01Q 3/24* (2006.01)
*G01V 3/10* (2006.01)

(52) U.S. Cl.
CPC .............. *H01Q 7/08* (2013.01); *G01V 3/105* (2013.01); *H01Q 3/24* (2013.01)

(58) Field of Classification Search
CPC .. H01Q 7/08; H01Q 3/22; H01Q 3/24; G01V 3/104; G01V 3/08; G01V 3/10; G01V 3/105; G01V 3/107; G01V 3/28; G01V 2003/85

See application file for complete search history.

(56) References Cited

U.S. PATENT DOCUMENTS

| | | | | | |
|---|---|---|---|---|---|
| 3,728,617 | A | * | 4/1973 | Potter | G01R 31/50 324/510 |
| 4,256,932 | A | * | 3/1981 | Owen | H01F 29/02 200/11 TC |
| 4,472,684 | A | * | 9/1984 | Schuster | G01V 3/28 324/323 |
| 5,973,948 | A | * | 10/1999 | Hahn | H01R 13/6675 363/143 |
| 5,986,617 | A | * | 11/1999 | McLellan | H03H 7/38 323/355 |

(Continued)

FOREIGN PATENT DOCUMENTS

| | | |
|---|---|---|
| CN | 1784613 A | 6/2006 |
| CN | 1973215 A | 5/2007 |

(Continued)

OTHER PUBLICATIONS

International Search Report for International Application No. PCT/US2016/015806; (dated Apr. 1, 2016) pp. 2.

(Continued)

*Primary Examiner* — Son T Le
*Assistant Examiner* — Dustin R Dickinson
(74) *Attorney, Agent, or Firm* — Haynes and Boone, LLP

(57) ABSTRACT

In accordance with some embodiments, an antenna is presented. In some embodiments, an antenna includes a plurality of coil arrays arranged along a core; and a switch coupled to each of the plurality of coil arrays, the switch connecting the plurality of coil arrays in one of a plurality of configurations in response to one or more sensitivity control signal.

9 Claims, 3 Drawing Sheets

(56) References Cited

U.S. PATENT DOCUMENTS

| | | | | |
|---|---|---|---|---|
| 6,130,539 | A | * | 10/2000 | Polak ................. G01V 3/15 324/326 |
| 7,336,078 | B1 | | 2/2008 | Merewether et al. |
| 7,463,027 | B2 | | 12/2008 | Prammer et al. |
| 8,013,610 | B1 | * | 9/2011 | Merewether ......... G01V 3/101 324/329 |
| 2005/0096879 | A1 | | 5/2005 | Waite et al. |
| 2005/0253711 | A1 | * | 11/2005 | Nelson ............... F41H 11/136 340/552 |
| 2008/0024377 | A1 | | 1/2008 | Prestros |
| 2008/0238402 | A1 | * | 10/2008 | Kanno .................. G05F 1/12 323/318 |
| 2009/0021248 | A1 | * | 1/2009 | Bernard ............... G01V 3/107 324/207.26 |
| 2010/0259217 | A1 | * | 10/2010 | Baarman ............... H02J 5/005 320/108 |
| 2013/0049745 | A1 | * | 2/2013 | Lyon ................... G01V 3/104 324/239 |
| 2013/0106412 | A1 | * | 5/2013 | Nomura .............. G01R 15/205 324/252 |
| 2014/0139223 | A1 | | 5/2014 | Olsson et al. |
| 2015/0194944 | A1 | * | 7/2015 | Joshi .................. H04B 1/0458 327/551 |
| 2015/0204995 | A1 | * | 7/2015 | Olsson ................. G01S 19/13 324/329 |
| 2016/0072298 | A1 | * | 3/2016 | Fine .................... H02J 7/025 307/104 |

FOREIGN PATENT DOCUMENTS

| | | |
|---|---|---|
| CN | 101288203 A | 10/2008 |
| CN | 102055505 A | 5/2011 |
| CN | 104443668 A | 3/2015 |
| DE | 428628 C | 5/1926 |

OTHER PUBLICATIONS

Written Opinion of the International Searching Authority for International Application No. PCT/US2016/015806; (dated Apr. 1, 2016) pp. 4.

Extended European Search Report and Search Opinion dated Aug. 1, 2018 issued in parallel European Patent App. No. 16744232.6 (8 pages).

Communication pursuant to Article 94(3) EPC from European Patent Application No. 16744232.6, dated Jun. 24, 2020, pp. 1-6.

* cited by examiner

//ANTENNA FOR UNDERGROUND LINE LOCATION

RELATED APPLICATION

This application is related to and claims priority to U.S. Patent Provisional Application 62/110,384 entitled "Antenna Configuration for Underground Line Location," filed on Jan. 30, 2015, which is herein incorporated by reference in its entirety.

BACKGROUND

Technical Field

The present disclosure relates to detection of underground lines and, in particular, to an antenna configuration for use in underground line location.

Discussion Of Related Art

Underground pipe and cable locators (often termed line locators) have existed for many years and are described in many issued patents and other publications. Line locator systems typically include a mobile receiver and a transmitter. The transmitter is coupled to a target conductor, either by direct electrical connection or through induction, to provide a current signal on the target conductor. The receiver detects and processes signals resulting from the electromagnetic field generated at the target conductor as a result of the current signal, which can be a continuous wave sinusoidal signal provided to the target conductor by the transmitter.

The transmitter is often physically separate from the receiver, with a typical separation distance of several meters or in some cases up to many kilometers. The transmitter couples the current signal, whose frequency can vary from few Hz to several kHz and be user chosen from a selectable set of frequencies, to the target conductor. The frequency of the current signal applied to the target conductor can be referred to as the active locate frequency. The target conductor then generates an electromagnetic field at the active locate frequency in response to the current signal.

Location results can be improved, for example, by using multiple different frequencies. Therefore, there is a need for antennas that optimize sensitivity.

SUMMARY

In accordance with some embodiments, an antenna is presented. In some embodiments, an antenna includes a plurality of coil arrays arranged along a core; and a switch coupled to each of the plurality of coil arrays, the switch connecting the plurality of coil arrays in one of a plurality of configurations in response to one or more sensitivity control signal.

These and other embodiments will be described in further detail below with respect to the following figures.

The drawings may be better understood by reading the following detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Additionally, the drawings are not to scale. Relative sizes of components are for illustrative purposes only and do not reflect the actual sizes that may occur in any actual embodiment of the invention. Like numbers in two or more figures represent the same or similar elements. Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Further, embodiments of the invention are illustrated with reference to electrical schematics. One skilled in the art will recognize that these electrical schematics represent implementation by physical electrical circuits, implementation by processors executing algorithms stored in memory, or implementation by a combination of electrical circuits and processors executing algorithms.

Figure 1:
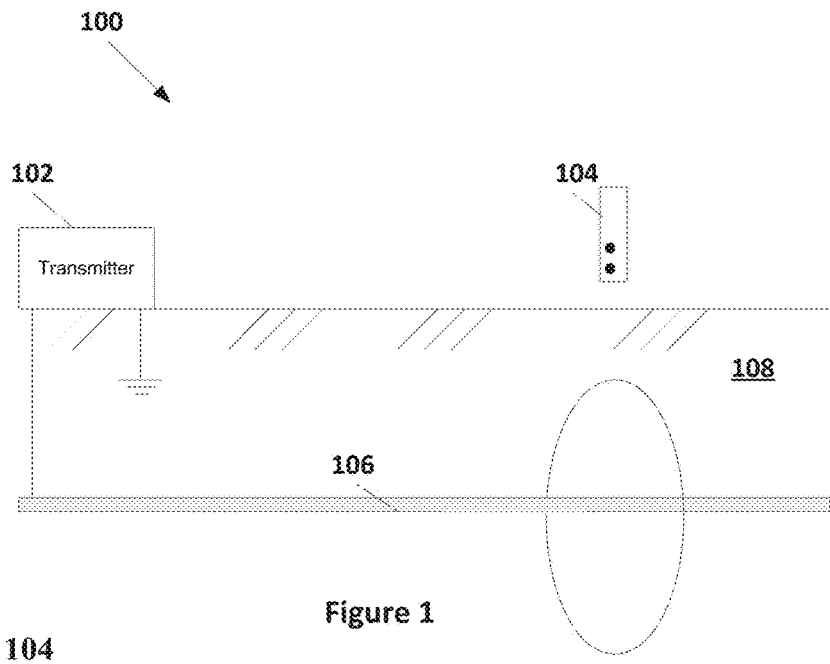
FIG. 1 illustrates operation of a line locator system according to some embodiments of the present invention.

FIG. 1 illustrates a line location system 100 according to some embodiments of the present invention. As shown in FIG. 1, line location system 100 includes a transmitter 102 and a receiver 104. Transmitter 102 is electrically coupled to a conductor 106 that is buried in the ground 108. Conductor 106 may, for example, be a conducting pipe or a wire and is generally considered to be a long conducting structure. Transmitter 102 provides an electrical signal along conductor 106, which then transmits an electromagnetic signal along its length. The electromagnetic signal is received by one or more antennae on receiver 104. Receiver 104 is passed over the surface of the ground 108 in order to locate the position of conductor 106 beneath the ground. From the signal strength, the depth and position of conductor 106 can be determined.

Figure 2:
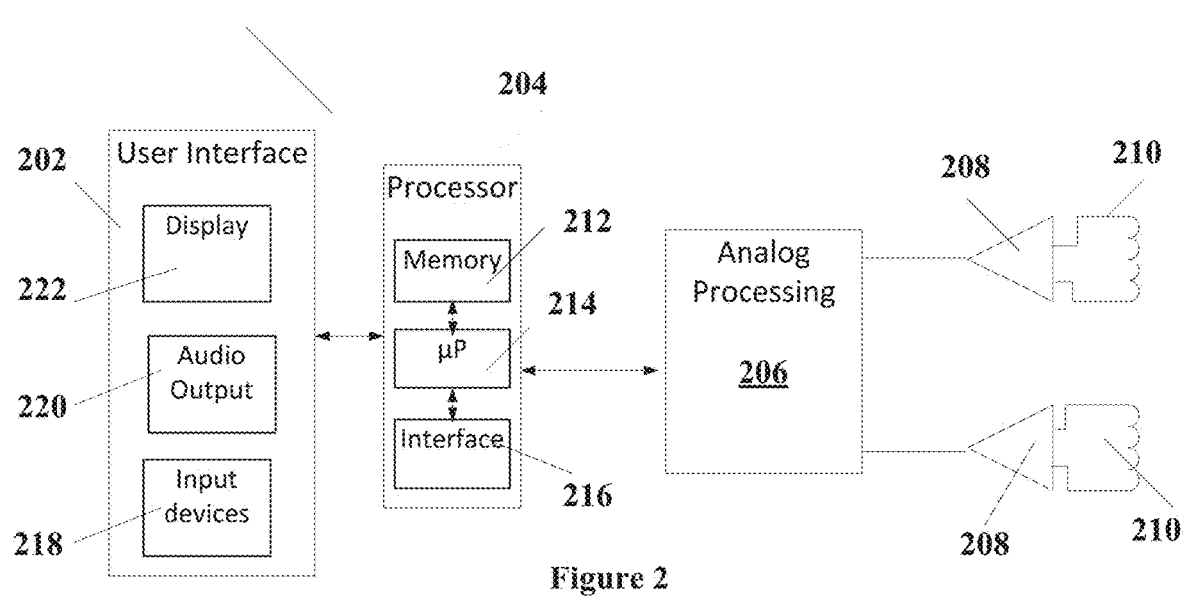
FIG. 2 illustrates at a high level block diagram of a receiver in a line locator system.

FIG. 2 illustrates a block diagram of an example receiver 104. Receiver 104 includes one or more antennas 210. There may be any number of antennas 210, arranged in any fashion. In some embodiments, antennas 210 may be arranged in orthogonal fashion to measure the 3D components of the magnetic field generated from conductor 106. For example, three of antennas 210 may positioned orthogonally to one another. Other configurations of multiple antennas 210 can be used. For example, vertically arranged antennas can be used to find the horizontal component of the magnetic field (which will occur as a null in the vertical antenna) or horizontally oriented antennas placed apart vertically can be used to estimate a depth of the conductor 106.

As is further shown in FIG. 2, signals from antenna 210 are received in a low noise amplifier 208 and processed by analog processing 206. Analog processing 206 can include filters or other electronics for processing the signals from antennas 210 and further includes an analog-to-digital converters for providing digital signal outputs to processor 204. Processor 204 further processes the data from antennas 210 to provide information to a user through user interface 202. Further, user interface 202 may include user inputs for adjusting parameters in either analog processing or procedures running in processor 204 that affect the processing of the received data.

As is further shown in FIG. 2, processor 204 can be dedicated circuitry devoted to analyzing and displaying data received from analog processing 206. In some embodiments, processor 204 can include a microprocessor 214 coupled to a memory 212 and an interface 216. Memory 212 can be any combination of volatile or non-volatile memory systems that hold data and programming instructions for microprocessor 214. Interface 216 can be any interface that allows processor 204 to communicate with devices such as analog processing 206 and user interface 202, along with other data input and output devices that may be coupled to processor 204.

User interface 202 can be any display or input device to provide data and receive data from a user. As shown in FIG. 2, user interface 202 can include a display 222, audio output 220, and input devices 218. Input devices 218 can include keyboards, pointing devices, touch screens, or other devices to allow a user to input data to processor 204.

Figure 3:
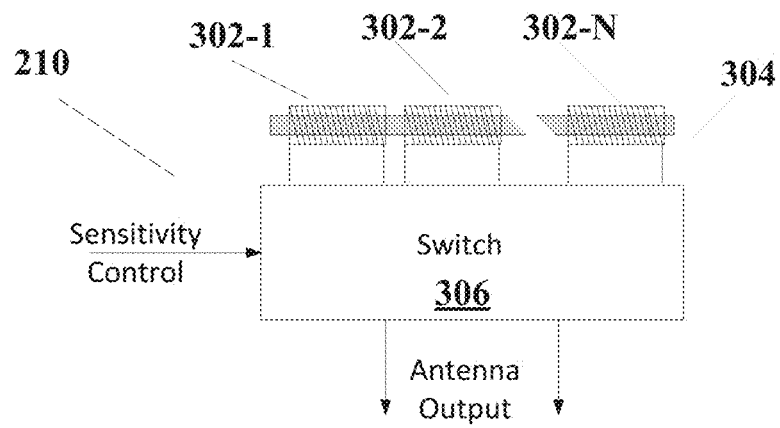
FIG. 3 illustrates an antenna according to some embodiments.

FIG. 3 illustrates an embodiment of antenna 210. As shown in FIG. 3, antenna 210 includes one or more coil arrays 302-1 through 302-N positioned along a core 304. Core 304 can be, for example, a magnetic core or core 304 may represent an air core. Each of the coil arrays 302-1 through 302-N can be formed with any number of turns. In some examples, for example, coil arrays 302-1 through 302-N can have 300 turns.

In some conventional systems, an antenna may be formed of a large number of turns wrapped around a core. Taps may be formed along the turns so that a system may pick the number of individual turns that will be used in the antenna. Sensitivity of the antenna can be adjusted by using more or fewer turns of the large number of turns. However, these arrangements result in a portion of the large number of turns not being connected (i.e., the end number of turns are left unconnected). Such a system can actually reduce the sensitivity of the coils due to interference from the unconnected turns.

In the embodiment shown in FIG. 3, however, leads from each of the coil arrays 302-1 through 302-N are input to switch 306. There antenna configuration will not result in unconnected numbers of turns in the coil arrays. Switch 306 connects the leads from each of coil arrays 302-1 through 302-N in response to the sensitivity control signal input. The sensitivity control signal can be derived from an input in user interface 202, can be automatically indicated by processor 204, or can be set by a separate mechanical input, for example. Sensitivity control signal can be a single electrical signal or a number of individual signals received by switch 306 to indicate a switching arrangement. Antenna arrays 302-1 through 302-N can be connected in any way, for example in series or in parallel, that results in all coils in all of antenna arrays 302-1 through 302-N be included in the circuit. Switch 306 then provides the combined antenna output that results from the connection of antenna arrays 302-1 through 302-N.

As an example, if N is three and each of the antenna arrays 302-1 through 302-N includes 300 turns, then when switch 306 connects the antenna arrays 302-1 through 302-N in series an antenna with 900 turns results. When connected in parallel, an antenna with 300 turns results. If two are connected in parallel and the pair connected in series with the third, an antenna array with 600 turns results. The sensitivity of the antenna with frequency depends on the number of turns in the antenna.

Figure 4:
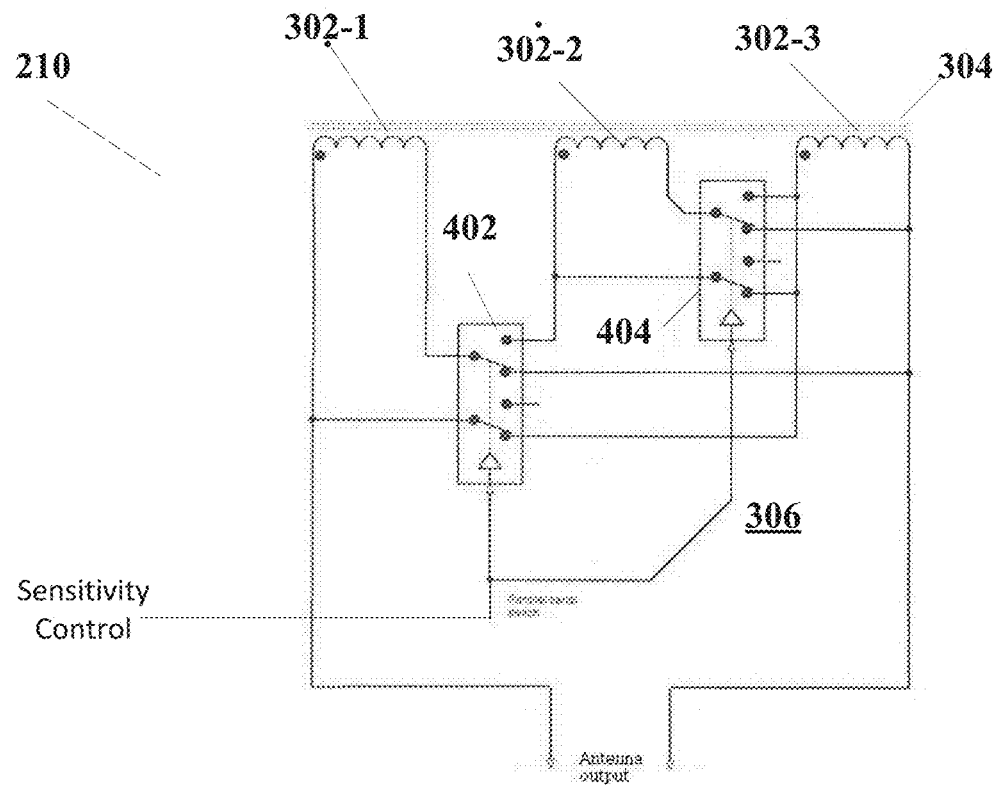
FIG. 4 further illustrates an antenna configuration according to some embodiments.

FIG. 4 illustrates an example of switch 306 that can connect three antennas 302-1 through 302-3 in series or in parallel in response to a sensitivity control signal that is either 0 or 1. As illustrated in FIG. 4, switches 402 and 404 control whether coils 302-1, 302-2 and 302-3 are connected in parallel or in series. As shown in FIG. 4, switches 402 and 404 are double pole double throw (DPDT) switches. In the illustrated position of switches 402 and 404, coils 302-1 through 302-3 are coupled in parallel. In the opposite orientation as the one shown, coils 302-1 through 302-3 are coupled in series. Switches 402 and 404 are controlled by the sensitivity control signal which is input to switch 306.

Figure 5A:
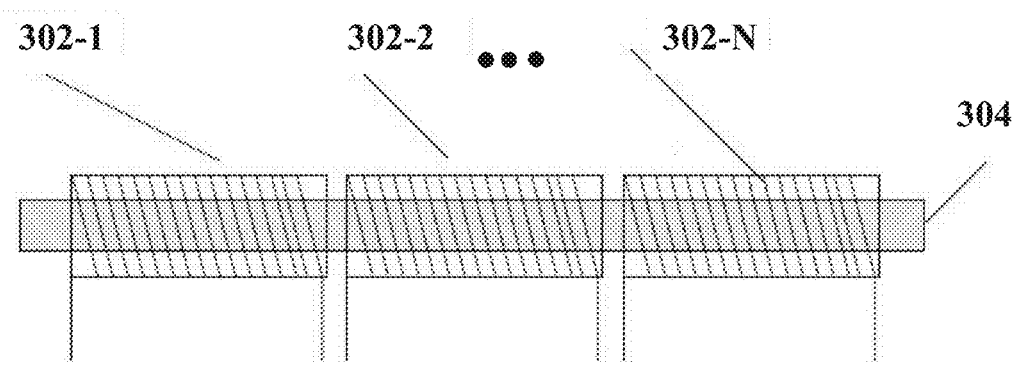
FIGS. 5A and 5B illustrates embodiments of an antenna.
Figure 5B:
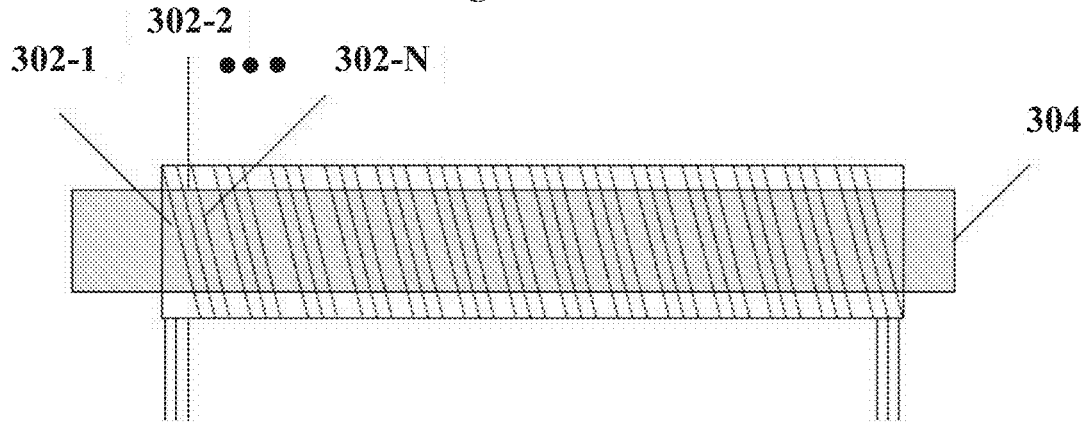

FIGS. 5A and 5B illustrates alternative arrangements for coil arrays 302-1 through 302-N. In some embodiments, a coil arrangement that combines aspects of the embodiments illustrated in FIGS. 5A and 5B may be used. As shown in Figure FIG. 3, the arrangement of coils formed by coil arrays 302-1 through 302-N is switched in switch 306 to provide an optimum sensitivity to a particular frequency signal. Consequently, multiple frequencies can be sensed during a locating session by switching coils 302-1 through 302-N in combinations of series and parallel connections to form an overall antenna that is particularly sensitive to the current active frequency.

As shown in FIG. 5A, coils 302-1 through 302-N are separated and arranged along core 304. As shown in FIG. 5B, coils 302-1 through 30-2-N are overlapping such that individual turns from each of coil arrays 302-1 through 302-N are adjacent to each other. Another embodiment may be formed where groups of coils arranged as illustrated in FIG. 5B can be separated along core 304 as illustrated in FIG. 5A. For example, a first coil group such as coils 302-1 through 302-*n* may be overlapping as illustrated in FIG. 5B, a second coil group such as coils 302-(n+1) through 302-*j* may be overlapping as illustrated in FIG. 5B, and the first coil group and second coil group may be separated as illustrated in FIG. 5A.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A receive antenna for a receiver of a line location system, comprising:
   a plurality of coil arrays, arranged along a core, that receive signals from an underground line that is driven by a transmitter of the line location system, the transmitter being coupled to the underground line to produce the signals; and
   a plurality of switches coupled to the plurality of coil arrays, each of the switches coupled across terminals of one of the coil arrays in the plurality of coil arrays, the plurality of switches forming multiple switch combinations, each switch combination configured to provide connections between each of the plurality of coil arrays to form the receive antenna, wherein each of the multiple switch combinations results in the receive antenna including all of the plurality of coil arrays, wherein the plurality of switches receives sensitivity control signals that determine which of the multiple switch combinations to set to form the receive antenna, wherein the sensitivity control signals relate to a receive frequency of the receive antenna, wherein each of the plurality of switches receives a first sensitivity control signal or a second sensitivity control signal, the first sensitivity control signal providing a first switch combination where the plurality of coil arrays are in series, and the second sensitivity control signal providing for a second switch combination where the plurality of coil arrays are in parallel, and wherein at least a portion of the plurality of coil arrays are overlapping such that individual turns from each of the plurality of coils are adjacent to each other.

2. The antenna of claim 1, wherein the plurality of configurations includes a series configuration and a parallel configuration.

3. The receive antenna of claim 1, wherein each of the plurality of switches is a double-pole double-throw (DPDT) switch.

4. A method of receiving a signal from an underground line that is coupled to a transmitter of a line location system with a receive antenna of a receiver of the line location system, comprising:

driving the underground line with the transmitter to generate the signal;

selecting a selected configuration of a plurality of coil arrays arranged along a core from a plurality of configurations based on a desired working frequency of the antenna to receive the signal from the underground line, wherein all coils in the plurality of coil arrays are included in each of the plurality of configurations; and coupling the plurality of coil arrays according to the selected configuration using a plurality of switches to form the receive antenna, each of the switches coupled across one of the coils in the plurality of coils, the selected configuration based on sensitivity control signals according to a selected frequency, wherein each of the plurality of switches receives a first sensitivity control signal or a second sensitivity control signal, the first sensitivity control signal providing a first switch combination where the plurality of coil arrays are in series, and the second sensitivity control signal providing for a second switch combination where the plurality of coil arrays are in parallel, and wherein at least a portion of the plurality of coil arrays are overlapping such that individual turns from each of the plurality of coils are adjacent to each other.

5. The method of claim 4, wherein the coupling a plurality of coil arrays includes coupling the coil arrays in parallel.

6. The method of claim 4, wherein coupling a plurality of coil arrays includes coupling the coil arrays in series.

7. The method of claim 4, wherein coupling a plurality of coil arrays includes coupling the coil arrays in a combination of series and parallel configurations.

8. The method of claim 4, wherein the plurality of coil arrays include a first and a second group of overlapping coil arrays, the first and second group being arranged in a separated fashion along the core.

9. The method of claim 4, wherein each of the plurality of switches is a double-pole double-throw (DPDT) switch.

* * * * *